United States Patent
Appleton

[19]
[11] Patent Number: 5,806,615
[45] Date of Patent: Sep. 15, 1998

[54] APPARATUS FOR USE IN A WELLBORE

[75] Inventor: Robert Patrick Appleton, Torphins, Scotland

[73] Assignee: Drilltech Services (North Sea), Ltd., Aberdeen, United Kingdom

[21] Appl. No.: 627,352

[22] Filed: Apr. 4, 1996

[30] Foreign Application Priority Data

Apr. 7, 1995 [GB] United Kingdom .................... 9507277
Jan. 16, 1996 [GB] United Kingdom .................... 9600877

[51] Int. Cl.$^6$ ........................................ E21B 17/10
[52] U.S. Cl. .......................... 175/325.7; 138/110
[58] Field of Search ..................... 175/325.5, 325.6, 175/325.7; 166/241.6, 241.7; 285/419, 373, 360, 376, 401, 91; 138/110

[56] References Cited

U.S. PATENT DOCUMENTS

| | | |
|---|---|---|
| H1192 | 6/1993 | Keller .................................... 166/241.6 |
| 1,974,546 | 9/1934 | Shipley . |
| 2,064,336 | 12/1936 | Bates . |
| 2,378,738 | 6/1945 | Smith . |
| 2,387,725 | 10/1945 | Every .......................................... 166/5 |
| 2,424,027 | 7/1947 | Gist . |
| 2,657,101 | 10/1953 | Williams et al. . |
| 2,715,552 | 8/1955 | Lane . |
| 2,739,018 | 3/1956 | Collett ...................................... 308/4 |
| 2,758,891 | 8/1956 | Kammerer . |
| 2,860,013 | 11/1958 | Medearis . |
| 2,973,996 | 3/1961 | Self . |
| 3,049,382 | 3/1962 | Ell . |
| 3,094,360 | 6/1963 | Collett . |
| 3,129,982 | 4/1964 | Fawick . |
| 3,148,004 | 9/1964 | Hall et al. . |
| 3,164,216 | 1/1965 | Hall, Sr. et al. . |
| 3,276,824 | 10/1966 | Carter ........................................ 308/4 |
| 3,397,017 | 8/1968 | Grant et al. . |
| 3,442,558 | 5/1969 | Sable . |
| 3,482,889 | 12/1969 | Cochran . |
| 3,592,515 | 7/1971 | Grant .................................. 175/325.6 |
| 3,642,079 | 2/1972 | Van Note ................................ 175/325 |
| 3,680,647 | 8/1972 | Dixon et al. ............................ 175/325 |
| 3,894,780 | 7/1975 | Broussard ............................... 308/4 A |
| 3,933,203 | 1/1976 | Evans ...................................... 166/241 |
| 3,933,395 | 1/1976 | Evans ..................................... 308/4 A |
| 3,938,853 | 2/1976 | Jurgens et al. ......................... 308/4 A |
| 4,000,549 | 1/1977 | Brumley et al. .......................... 24/263 |
| 4,042,023 | 8/1977 | Fox ......................................... 166/241 |
| 4,245,709 | 1/1981 | Manuel ................................. 175/325.5 |
| 4,275,935 | 6/1981 | Thompson et al. .................... 308/4 A |
| 4,381,821 | 5/1983 | Greene, Jr. ............................. 166/243 |
| 4,436,158 | 3/1984 | Carstensen ............................. 166/377 |
| 4,484,785 | 11/1984 | Jackson .................................. 308/4 A |
| 4,487,433 | 12/1984 | Miller ........................................ 285/81 |
| 4,531,582 | 7/1985 | Muse et al. ............................. 166/241 |
| 4,549,613 | 10/1985 | Case ....................................... 175/325 |
| 4,601,334 | 7/1986 | Lovegrove .............................. 166/241 |
| 4,602,690 | 7/1986 | Steiger .................................... 175/325 |

(List continued on next page.)

FOREIGN PATENT DOCUMENTS

| | | |
|---|---|---|
| 2047775 | 4/1980 | United Kingdom . |
| 206/358 | 10/1980 | United Kingdom . |
| 2093891 | 2/1982 | United Kingdom . |
| PCT/GB94/ 02236 | 10/1994 | WIPO . |

OTHER PUBLICATIONS

Official Search Report from corresponding PCT case PCT/EP 96/01015.

UK Patent Office Search Report in foreign counterpart of present U.S. case.

Laboratory Drill Pipe Protector Tests, Garkasi et al, A S M E PD vol. 56 Drilling Technology, 1994.

Primary Examiner—William P. Neuder
Attorney, Agent, or Firm—Howard & Howard

[57] ABSTRACT

An apparatus for use in a wellbore comprises an inner member mountable on or formed as an integral part of a drill string, and an outer member removably mounted on the inner member. In a preferred embodiment the apparatus can be used as a stabilizer for said drill string.

41 Claims, 11 Drawing Sheets

U.S. PATENT DOCUMENTS

| | | | |
|---|---|---|---|
| 4,606,417 | 8/1986 | Webb et al. | 175/76 |
| 4,630,690 | 12/1986 | Beasley et al. | 175/57 |
| 4,776,410 | 10/1988 | Perkin et al. | 175/325 |
| 4,794,986 | 1/1989 | Langer | 166/241 |
| 4,796,670 | 1/1989 | Russell et al. | 175/325.6 X |
| 4,865,138 | 9/1989 | Swietlik | 175/325 |
| 4,984,633 | 1/1991 | Langer et al. | 166/241 |
| 5,095,981 | 3/1992 | Mikolajczyk | 166/241.6 |
| 5,190,324 | 3/1993 | Bird et al. | 285/373 X |
| 5,191,938 | 3/1993 | Sable et al. | 166/378 |
| 5,261,488 | 11/1993 | Gullet et al. | 166/241.7 |
| 5,465,759 | 11/1995 | Carlson et al. | 175/325.7 X |
| 5,480,193 | 1/1996 | Echols et al. | 285/373 X |

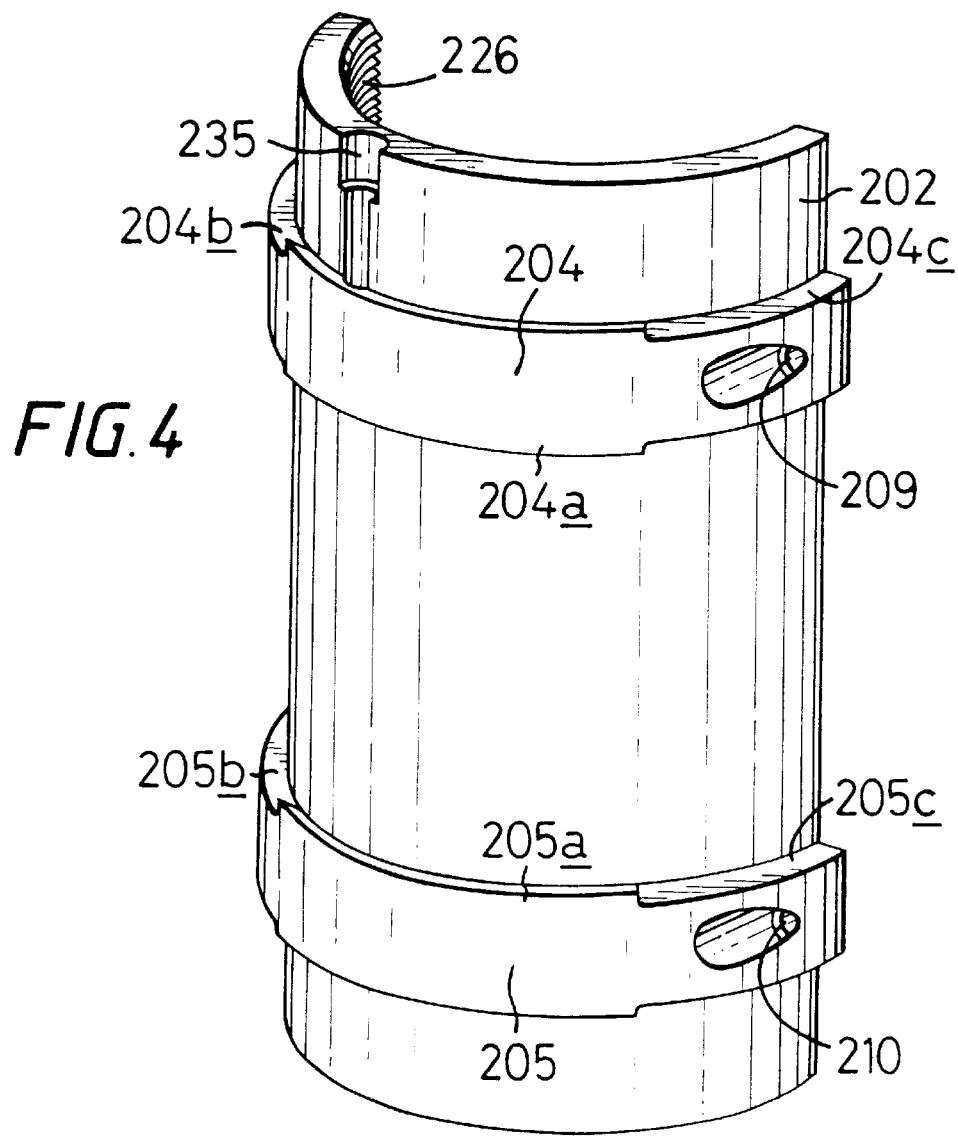
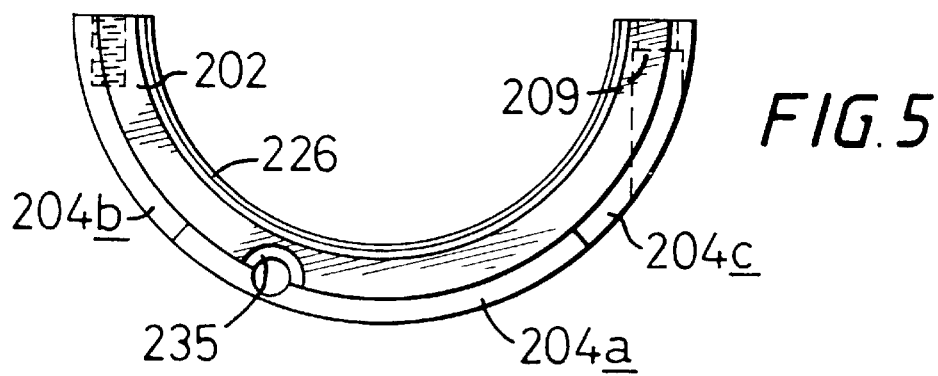

APPARATUS FOR USE IN A WELLBORE

FIELD OF THE INVENTION

This invention relates to an apparatus for use in a wellbore and, more particularly but not exclusively, to an apparatus for stabilizing a drill string.

BACKGROUND OF THE INVENTION

During the construction of conventional oil and gas wells a wellbore is formed by rotating a drill bit on the end of a drill string. The drill string is maintained substantially on the longitudinal axis of the wellbore by a plurality of apparatus which are generally referred to as "stabilizers" and which are mounted on the drill string at predetermined intervals there along.

Typically, two heavy duty stabilizers are disposed immediately above the drill bit. These heavy duty stabilizers comprise a central shaft which forms part of the drill string and a plurality of spiral shaped fins which are made of very hard metal. Because of their construction these heavy duty stabilizers are very expensive, typically costing of the order of $10,000 each. The remaining stabilizers are low duty stabilizers which are of significantly less rugged construction and are typically slipped over the drill string and rotatably held between two stop collars secured mounted on the drill string. Typically such low duty stabilizers cost about $1000 each.

Whilst this arrangement is quite satisfactory for drilling conventional vertical wellbores problems arise in deviated drilling in which it is desired to drill one part of a wellbore at an angle to a vertical wellbore. In particular, as the drill string changes direction enormous lateral loads are placed on the stabilizers. At the present time the construction of the low duty stabilizers is such that there is a high probability that they will disintegrate leaving undesirable debris in the wellbore.

At first sight it would appear that heavy duty stabilizers should be used. However, bearing in mind that stabilizers are typically required every 10 m it can readily be appreciated that the cost would be very high. A further problem is that heavy duty stabilizers consume a large amount of rotational energy and the use of a significant number of these on a drill string would create so much drag that it would be difficult, if not impossible, to rotate the drill bit from the surface.

At the present time one practice is to use two heavy duty stabilizers in the vicinity of the drill bit and leave the portion of the drill pipe in the deviated section unstabilised. This is a most unsatisfactory practice which can lead to rapid damage to the drill string if not total failure.

SUMMARY OF THE PRESENT INVENTION

According to one aspect of the present invention there is provided an apparatus for use in a wellbore, which apparatus comprises an inner member mountable on a drill string or forming part thereof, and an outer member removably mounted on said inner member.

Preferably, said inner member is provided with one or more male members and said outer member is provided with one or more female members which co-operate with said male member(s) to support said outer member on said inner member. However, it would also be possible for the inner member to be provided with one or more female members and the outer member with one or more male members for co-operation therewith. It would also be possible for both the inner and outer members to be provided with male and female members.

In one embodiment, at least part of the male member is of dovetail cross-section and at least part of the female member comprises a dovetail slot. Other shapes could however also be used, for example a "T" shape. It would also be possible for the male member to be formed by two "L" shape members spaced apart and facing in opposite directions.

If desired the inner member may be formed in two sections which may be secured together, for example bolted at both sides. Alternatively, the two sections may be hinged together at one side and secured together, for example bolted at the other. By using two sections the inner member may be quickly and simply mounted on a drill string at any location thereon. However, the inner member could conceivably comprise a part cylindrical member subtending an angle of, for example 350 degrees which could be slipped over the end of a drill pipe and clamped thereto by a bolt or similar connector acting between the free ends of the inner member.

Preferably, the inner member comprises two inner sections and said male member and said female member extend substantially around the entire periphery of said inner member and said outer member and are of substantially uniform cross-section throughout. In a preferred embodiment an outer section is mounted on each inner section. The apparatus is then arranged circumjacent a drill string and clamped thereto by one or more bolts which hold the inner sections together and are accessed by one or more holes in the outer member formed by the two outer sections. The outer sections are then rotated, preferably through 90° and held in position by one or more pins which are preferably introduced axially between the inner member and outer member to inhibit relative rotation there between.

Whilst this construction can provide a rugged apparatus it has, in its basic form, the disadvantage that if the outer member needs to be replaced the entire apparatus must be removed from a drill string.

In order to obviate this difficulty it is proposed to provide one of the inner member and the outer member with at least one male member which is of discontinuous cross-section and at least one female member which is of discontinuous cross-section, the arrangement being such that said outer member can be offered up to said inner member and rotated relative thereto so that the male member is entrapped by said female member.

Preferably, the inner member is provided with gripping means to help ensure that said inner member can be firmly attached to said drill string. One simple gripping means is to provide the inner member with a thread which forms a plurality of teeth which grip the drill string. Another alternative would be to use "non-marking jaws" as described in PCT Patent Application No. PCT/EP93/02381 (WO 94/058). Although the diameter of drill pipe used for conventional drilling varies significantly from its nominal diameter drill pipe used for direction drilling is usually manufactured to very high tolerances and consequently it is not anticipated that it will be necessary to provide special gripping means to accommodate wide variations in the diameter of a drill pipe. However, it is conceivable that it might be desirable to use a material on the inner member which would exfoliate or otherwise expand to more securely mount the inner member on the drill string in use.

Because a drill string is subject to continuous vibration it is important to try and ensure that any bolts or similar connectors which are used to hold the inner member fast on the drill string do not work loose. This could be effected by, for example securing the bolts with split pins. However, it will be appreciated that this would not be practical in the often inhospitable conditions in which drilling is carried out.

In order to help overcome this problem, preferred embodiments of the present invention are preferably constructed so that when the outer member is in its operative position it inhibits any connector for securing the inner member to a drill string separating from the apparatus.

Preferably, at least one pin is provided which can be introduced axially between the inner member and the outer member to inhibit relative rotation there between.

Advantageously, said pin is installed in a cavity which extends generally parallel to the longitudinal axis of said apparatus and is formed by alignment of a groove in said inner member and a groove in said outer member.

Whilst the apparatus thus far described provides a rugged stabilizer there is another problem encountered is deviated drilling. In particular, as the drill bit cuts into a formation it generates chips which are returned to the surface in the drilling mud. One of the problems associated with deviated drilling is that some of the chips do not stay in suspension in the drilling mud but settle along the bottom of the wellbore which may be nearly horizontal. This can cause severe problems. In particular, if a sufficient quantity of chips is allowed to settle the drill string cannot be withdrawn. This may necessitate cutting the drill string and sending down special tools to clear the chips and recover the severed end of the drill string. In order to avoid this problem the usual practice is for the operator to withdraw the drill string at regular intervals—typically every 8 to 12 hours depending on the nature of the formation. As the string is withdrawn the heavy duty stabilizers effectively rake the cuttings out of the deviated section of the wellbore.

We have found that if the outer member is provided with suitably shaped means, for example suitably shaped grooves, the rotation of the apparatus on a drill string will inhibit chips settling out of the drilling mud. By appropriately spacing such apparatus on a drill string the amount of sedimentation can be kept to a very small level.

Because of the extreme loads applied to apparatus in accordance with the invention as they pass around bends and the abrasion which they experience while rotating in open hole it is anticipated that frequent replacement of the outer member will be necessary. Accordingly, each time the drill string is withdrawn each apparatus can be checked for wear and the outer member replaced as and when necessary. In our prototype the outer member can be replaced easily and rapidly in a workshop environment.

Initial experiments suggest that inner and outer members in accordance with the invention can be made by investment casting.

The present invention also provides a drill string provided with an apparatus in accordance with the present invention.

Whilst the present apparatus is primarily intended for use as a stabilizer it will be appreciated that it can be used as a general purpose pipe protector. It could also be used as a centralizer. In addition, the inner member could be formed as part of a tubular. In such an embodiment, where the inner member is provided with a male member the male member may be formed as an integral part of the tubular or welded, riveted, bolted or adhered thereto.

If desired the outer member may contain instruments for monitoring parameters in the wellbore. The outer member could also comprise a tool, for example a milling tool, a fishing tool or a cutter.

For a better understanding of the present invention reference will now be made, by way of example, to the accompanying drawings, in which:

BRIEF DESCRIPTION OF THE DRAWINGS

FIG. 4 is a perspective view of an inner section of a second embodiment of an apparatus in accordance with the present invention;

FIG. 5 is a top plan view of the inner section shown in FIG. 4;

DETAILED DESCRIPTION OF THE PREFERRED EMBODIMENTS

Figure 1:
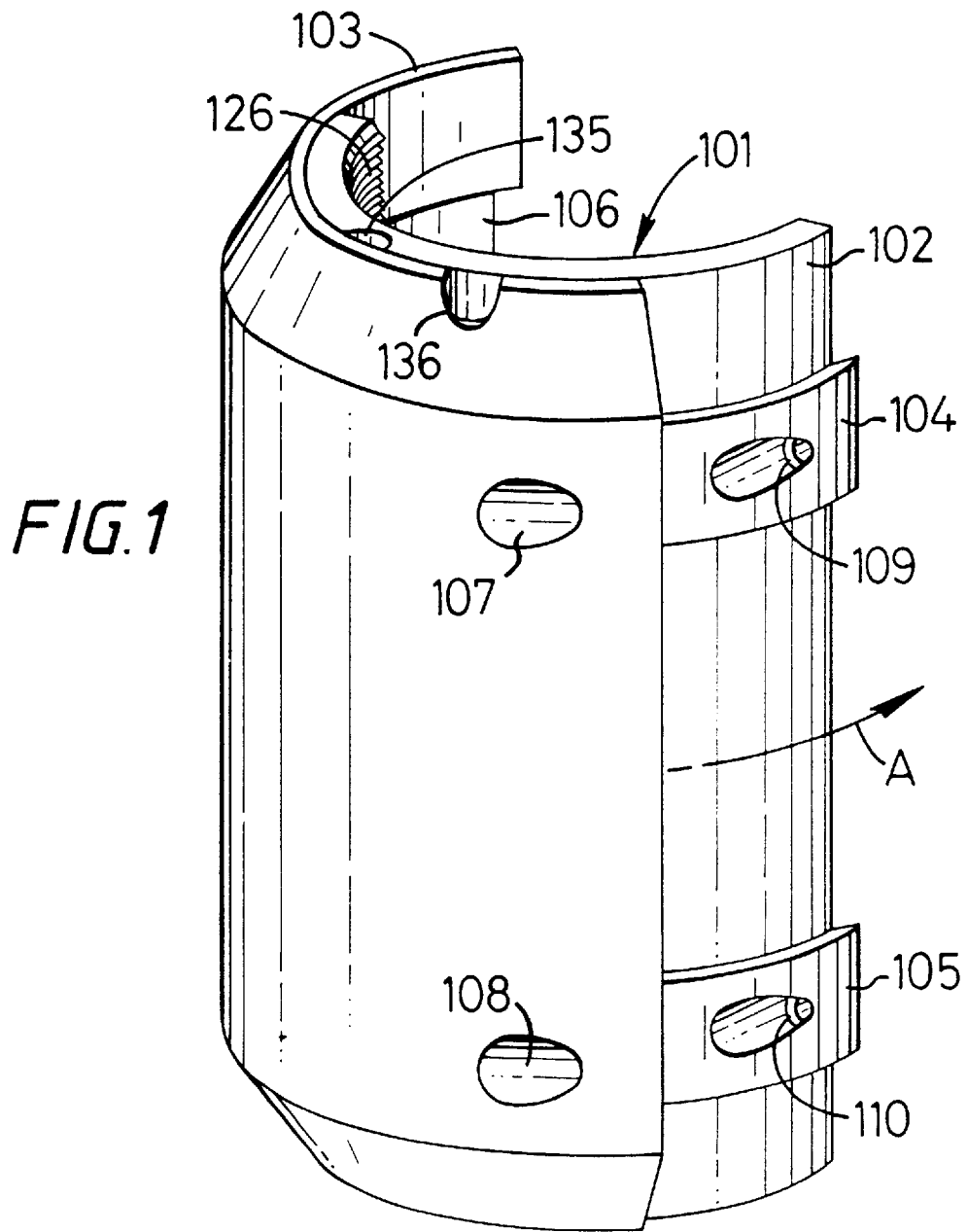
FIG. 1 is a perspective view showing one half of a first embodiment of an apparatus in accordance with the present invention during assembly.

Referring to FIG. 1 of the drawings there is shown one half 101 of a first embodiment of an apparatus in accordance with the present invention. The one half 101 comprises an inner section 102 and an outer section 103 which is removably mounted on the inner section 102. In particular, the inner section 102 is provided with two longitudinally spaced male members 104, 105 which are of dovetail cross section.

The outer section 103 is provided with two longitudinally spaced female members, the upper of which 106, is visible in FIG. 1. Each female member 106 is of dovetail cross section. The outer section 103 is mounted on the inner section 102 by aligning the female members with the male members and moving the outer section 103 in the direction of arrow "A" (FIG. 1) until the outer section 103 overlies the inner section 102.

Figure 2:
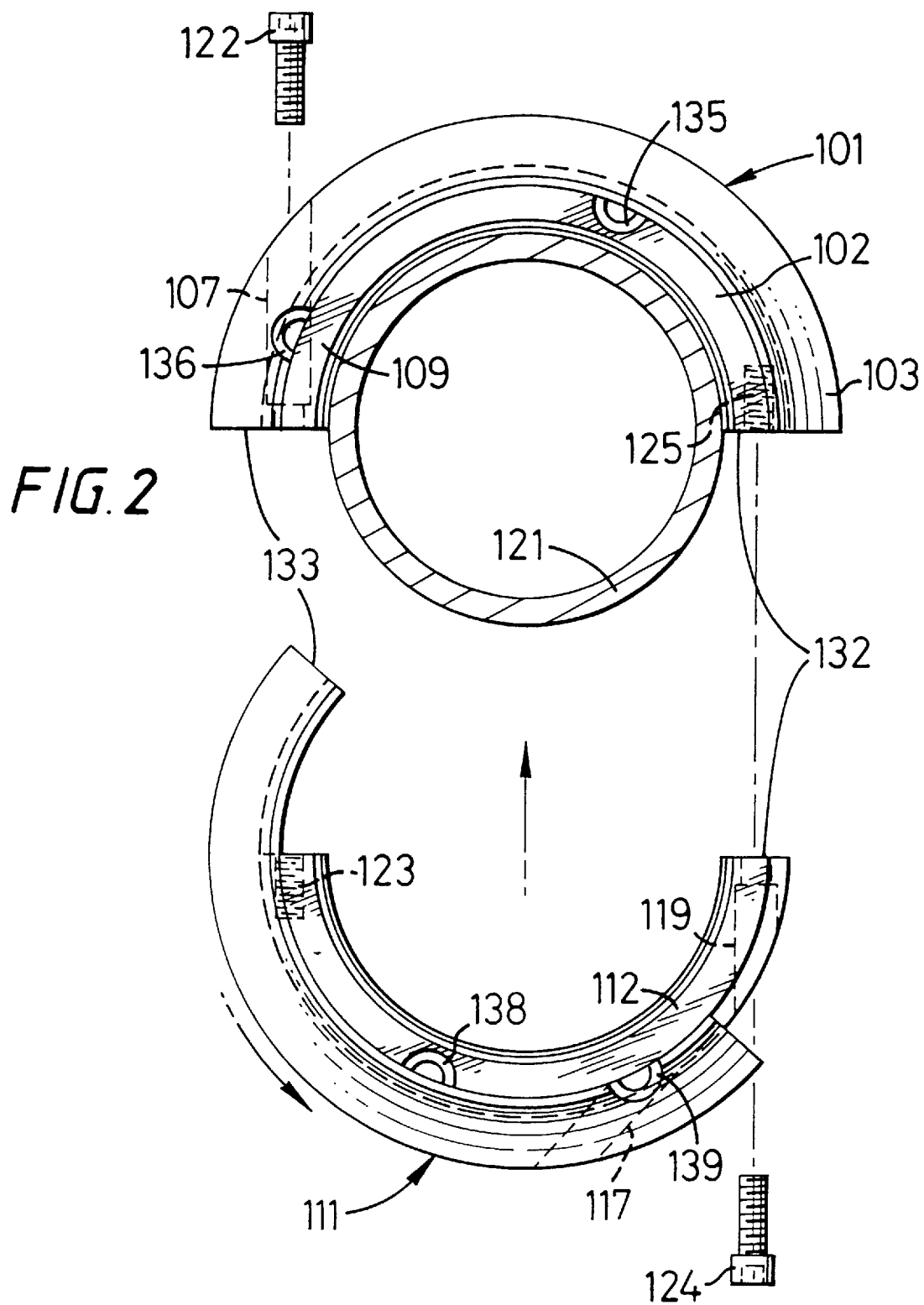
FIG. 2 is a top plan view showing the one half of the apparatus fully assembled and mounted on a drill string and the other half in the course of assembly.
Figure 3:
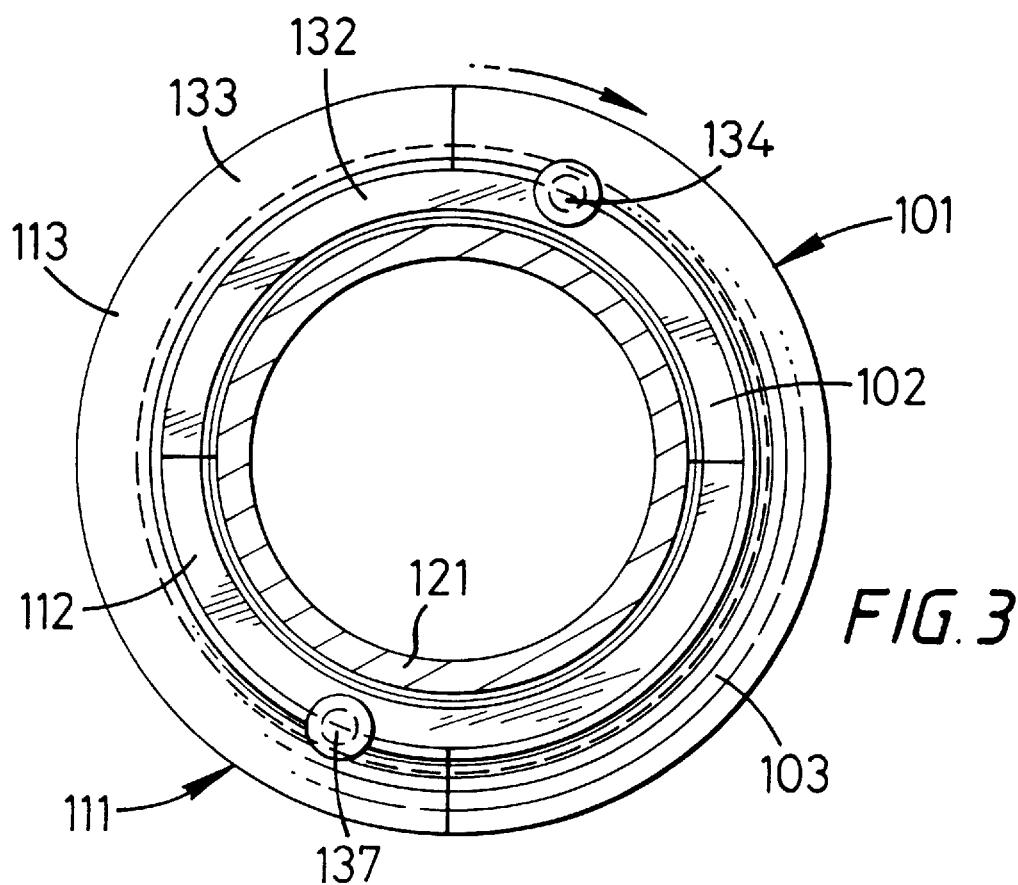
FIG. 3 is a top plan view of the apparatus mounted on the drill string, the drill string being shown in section.

At this point access slots 107, 108 in the outer section 103 are aligned with bores 109, 110 in the male members 104 and 105. At this stage the one half 101 can be positioned on a drill string 121 as shown in FIG. 2.

After the one half 101 has been mounted on the drill string 121 a second half 111 is assembled by mounting an outer section 113 on an inner section 112. The second half 111 is then positioned on the drill string 121 opposite the one half 101.

Socket screw 122 is then passed through access slot 107 and bore 109 and rotated to threadedly engage in threaded bore 123 in the inner section 112. Socket screw 124 is then passed through access slot 117 and bore 119 and rotated to threadedly engage in threaded bore 125 in the inner section 102.

The inside of the inner sections 102 and 112, which together form an inner member 132 are provided with a thread 126 which, as the socket screws 122 and 124 are tightened presses against and penetrate the outer surface of the drill string 121 and thereby inhibit relative movement between the inner member 132 and the drill string 121.

Additional socket screws are also used to secure the lower portions of the one half 101 and the second half 111 together.

It will be appreciated that at this stage the inner member 132 is firmly secured to the drill string 121 and the outer member 133 formed by outer section 103 and outer section 113 is rotatably mounted thereon.

Whilst this arrangement would be quite adequate for some purposes it suffers from two weaknesses. In particular, the socket screws 122,124 can vibrate loose and the structure could fail across the separating line between the one half 101 and the second half 111.

In order to overcome these disadvantages the outer member 133 is rotated through 90° with respect to the inner member 132 and locked in position by inserting a pin 134 into an axially extending bore formed by the alignment of two half bores 135, 136, one of which 135 is formed in the inner section 102 and the other 136 in the outer section 103. A second pin 137 may also be inserted in an axially extending bore formed by the alignment of two other half bores 138, 139, one of which 138 is formed in the inner section 112 and the other 139 of which is formed in the outer section 113.

As shown in FIG. 1, the top of the half bore 136 is cut away to allow access to a tool to remove the pin 134 when desired. It has been found that there is little tendency for the pins 134, 137 to work loose in practice. However, the pins 134 and 137 preferably each comprises a shaft which is provided with several axially spaced grooves each containing an elastomeric O-ring which acts between the shaft and the walls of the half bores to inhibit the pins 134 and 137 working loose.

In order to replace the outer member 133 the pins 134 and 137 must first be withdrawn. The outer member 133 is then rotated through 90° with respect to the inner member 132. The socket screws holding the inner sections 102, 112 together are then removed and the two halves 101, 111 removed from the drill string 121. The outer sections 103, 113 are then removed from the inner sections 102, 112. The outer sections 103, 113 are then replaced and the apparatus refitted to the drill string 121.

It will be appreciated that it would be extremely advantageous if the outer member 133 could be replaced without the need to remove the inner member 132. With this in mind attention is now drawn to the embodiments shown in FIGS. 4 to 17.

Referring to FIG. 4, there is shown an inner section 202. The inner section 202 is generally similar to the inner section 102 in that it is provided with two longitudinally spaced male members 204 and 205. However, whilst the male members 104 and 105 are of dovetail cross-section throughout their entire length the cross section of the male members 204 and 205 is discontinuous, each having a centre section 204a and 205a of dovetail cross-section and end sections 204b, 204c and 205b, 205c each of which are of rectangular cross-section.

Figure 6:
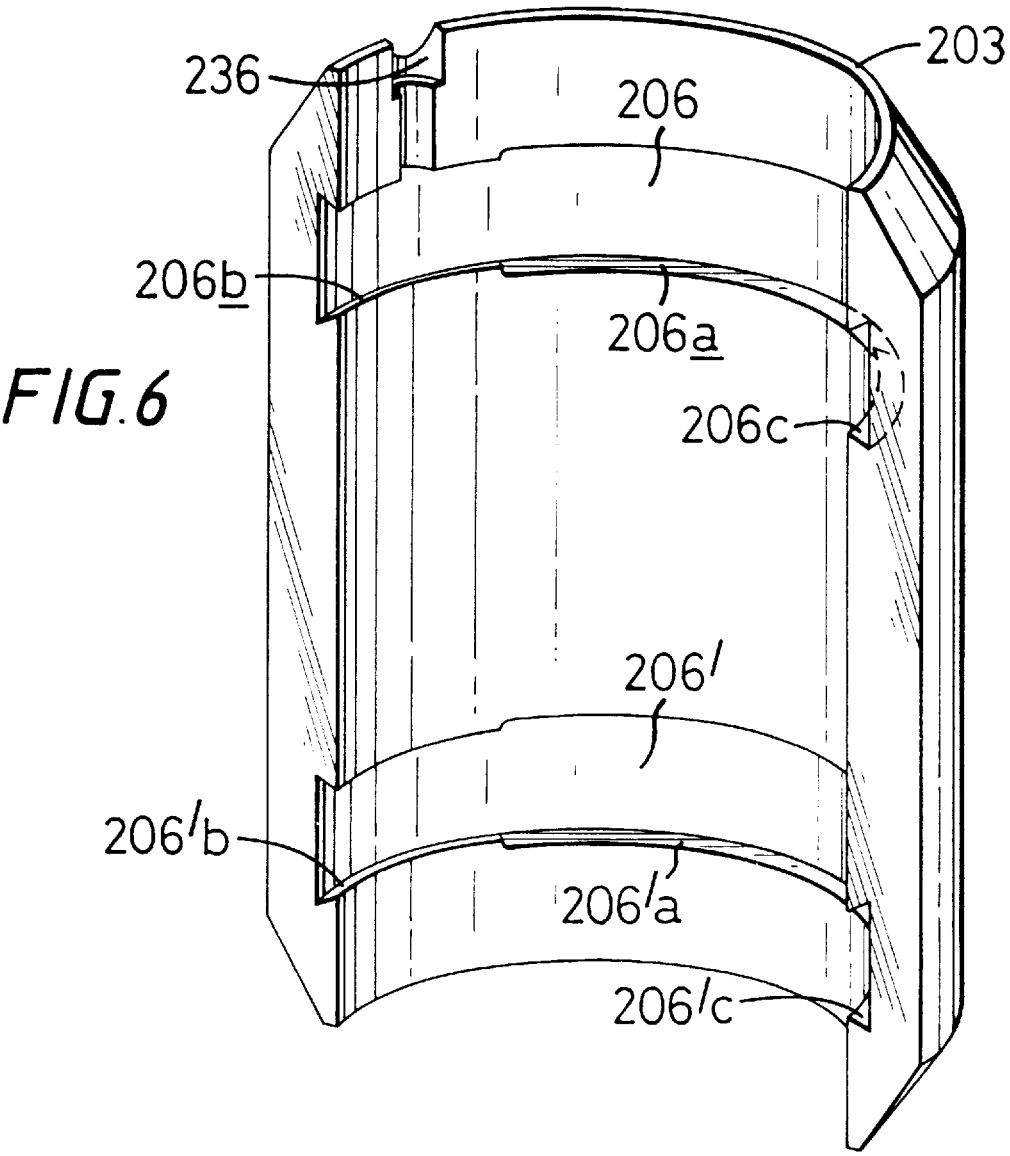
FIG. 6 is a perspective view of an outer section adapted to be mounted on the inner section shown in FIG. 4.

Turning now to FIG. 6, there is shown an outer section 203. The outer section 203 is generally similar to the outer section 103 except that instead of the female members 206 and 206' being of continuous dovetail cross-section they are of discontinuous cross-section, each having end sections 206b, 206c; 206'b, 206'c of dovetail cross-section separated by a central section 206a; 206'a of rectangular cross-section.

Figure 7:
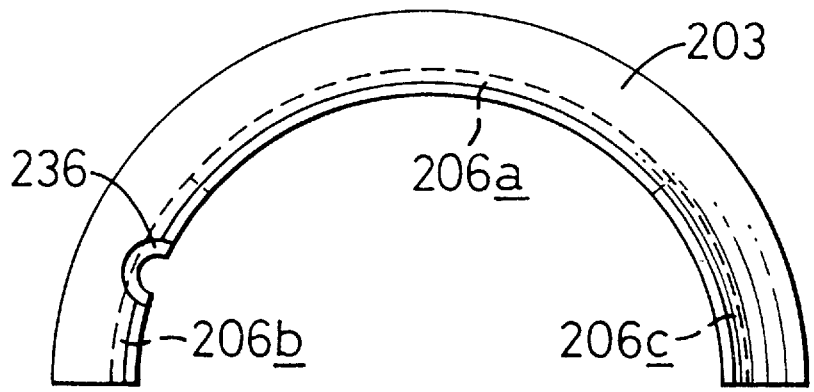
FIG. 7 is a top plan view of the outer section shown in FIG. 6.
Figure 8:
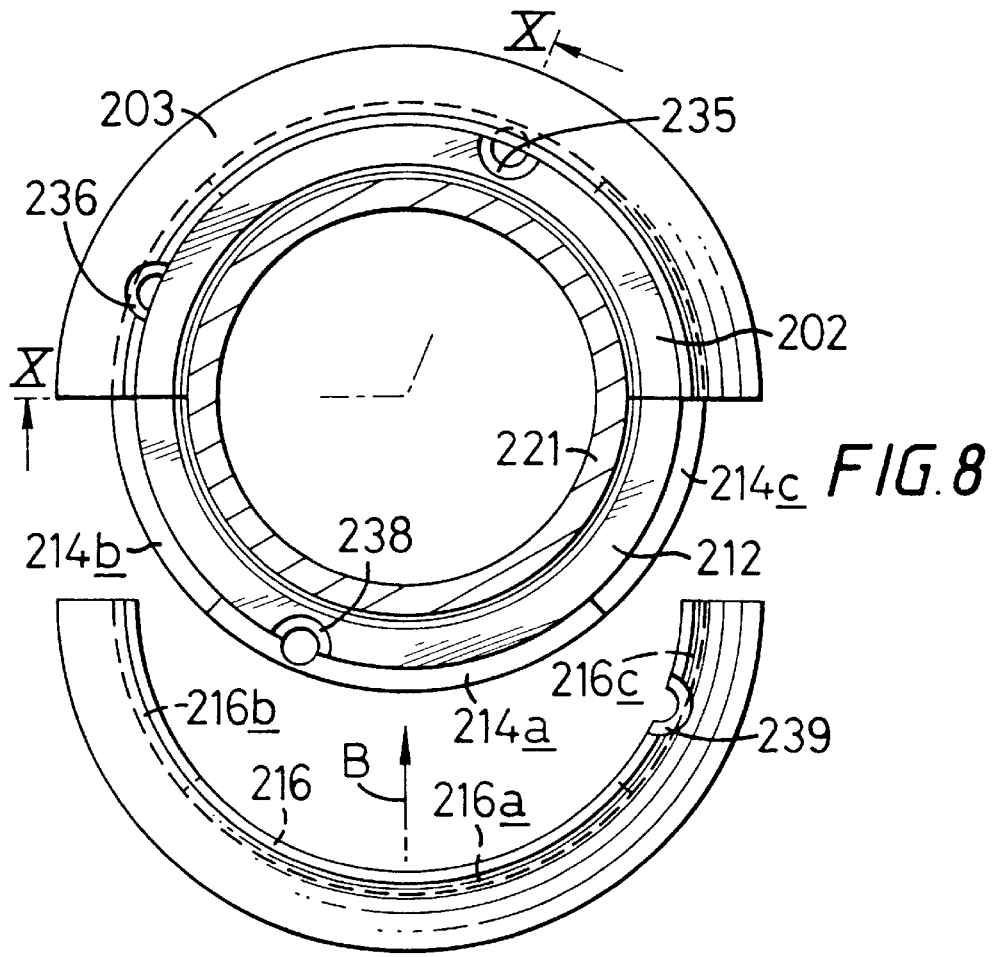
FIG. 8 shows the apparatus of FIGS. 4 to 7 being mounted on a drill string.
Figure 9:
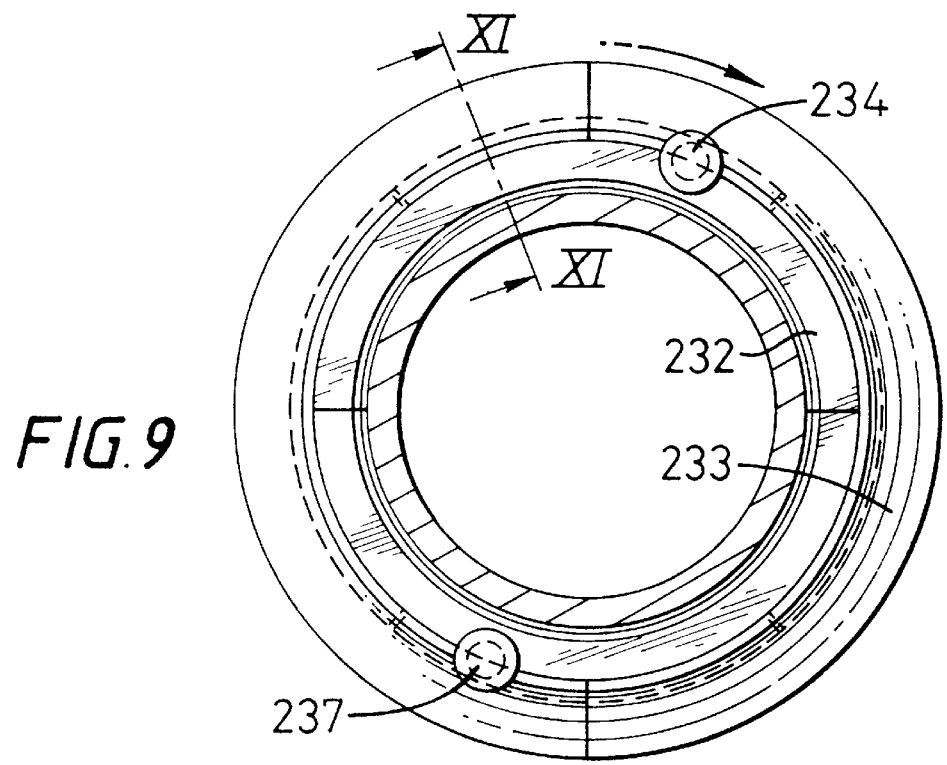
FIG. 9 is a top plan view of the apparatus of FIG. 8 mounted on a drill string, the drill string being shown in section.
Figure 10:
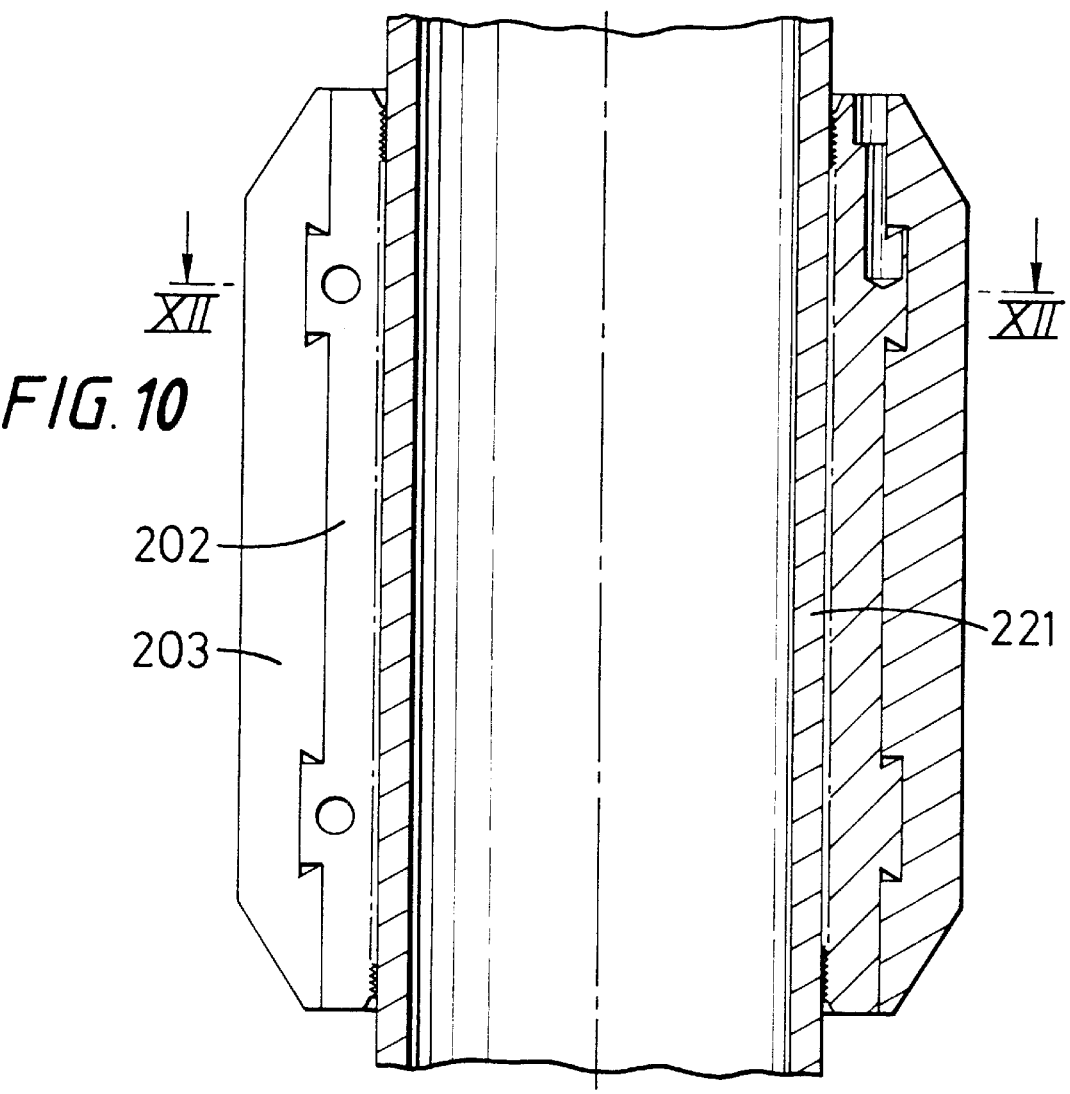
FIG. 10 is a section taken on line X—X of FIG. 8.

In use, the inner section 202 and a corresponding inner section 212 are first arranged circumjacent a drill pipe 221. The inner sections 202, 212 are then bolted together using socket screws which are tightened to the required torque to ensure that the apparatus does not slide along the drill string 221. The outer sections 203 and 213 are then mounted on the inner sections 202, 212 as shown in FIG. 7. As can be seen in FIG. 8, the outer section 213 is merely advanced towards the inner section 212 in the direction of the arrow "B".

As the outer section 213 approaches the inner section 212 the end sections 216b, 216c of dovetail cross-section of the female member 216 overlie the end sections 214b, 214c of rectangular cross-section of the male member 214. Similarly, the central section 214a of the male member 214 is accommodated within the middle section 216a of the female member 216. The inter-relationship of the parts can be better seen in FIG. 10.

Figure 11:
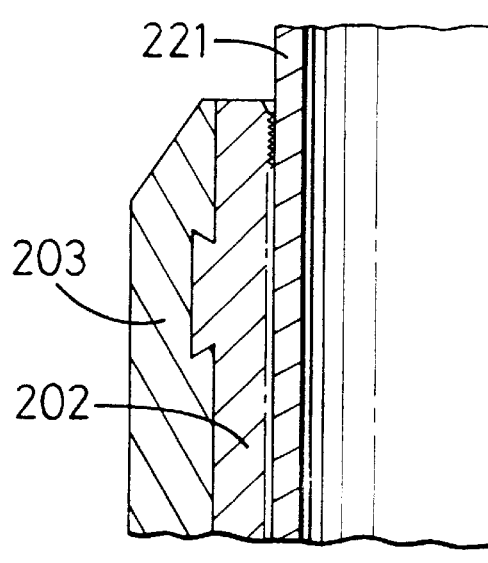
FIG. 11 is a scrap section taken on line XI—XI of FIG. 9.

Once the outer sections 203, 213 are positioned on the inner sections 202, 212 the outer member 233 comprising the two outer sections 203 and 213 is rotated 90° relative to the inner member 232 formed by the two inner sections 202 and 212. This causes the central section of the male member to engage in the end sections of the female members as shown in FIG. 11. Once they reach this position (FIG. 9) pins 234, 237 are pushed into the bores formed by alignment of the half bores 235, 236 and 238, 239. These pins 234, 237 inhibit relative rotation between the inner member 232 and the outer member 233. It will be noted that the use of at least one pin 234 or 237 is essential in this embodiment since relative rotation between the inner member 232 and the outer member 233 could result in separation of the outer sections 203, 213 from the inner member 232.

Figure 12:
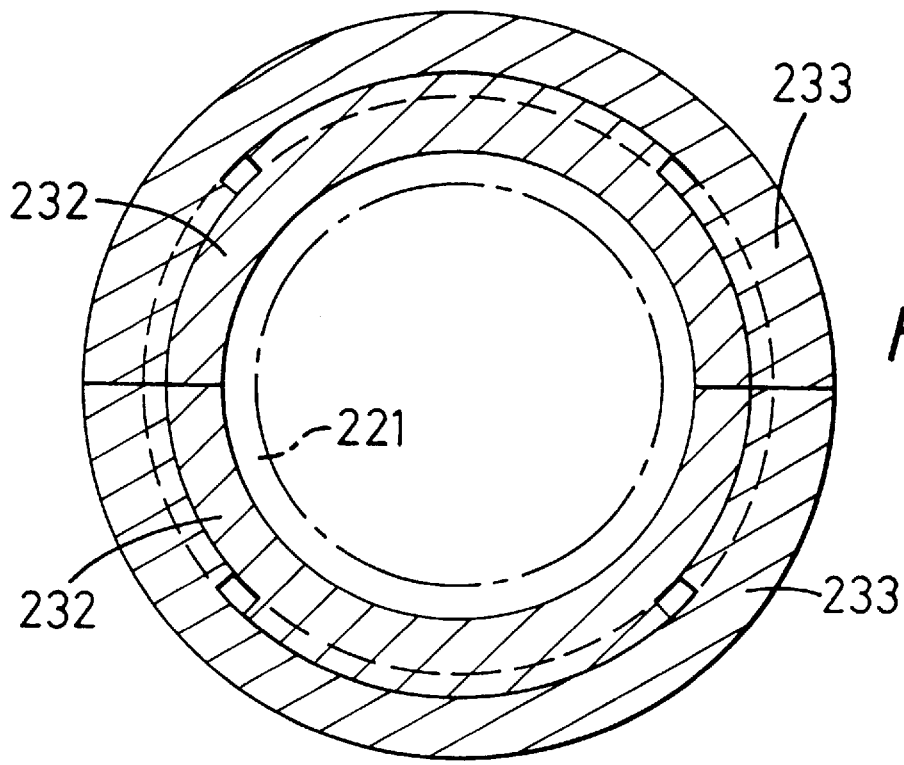
FIG. 12 is a schematic view taken approximately on line XII—XII of FIG. 10, the view being drawn to show the relative positions of the male and female members.
Figure 13:
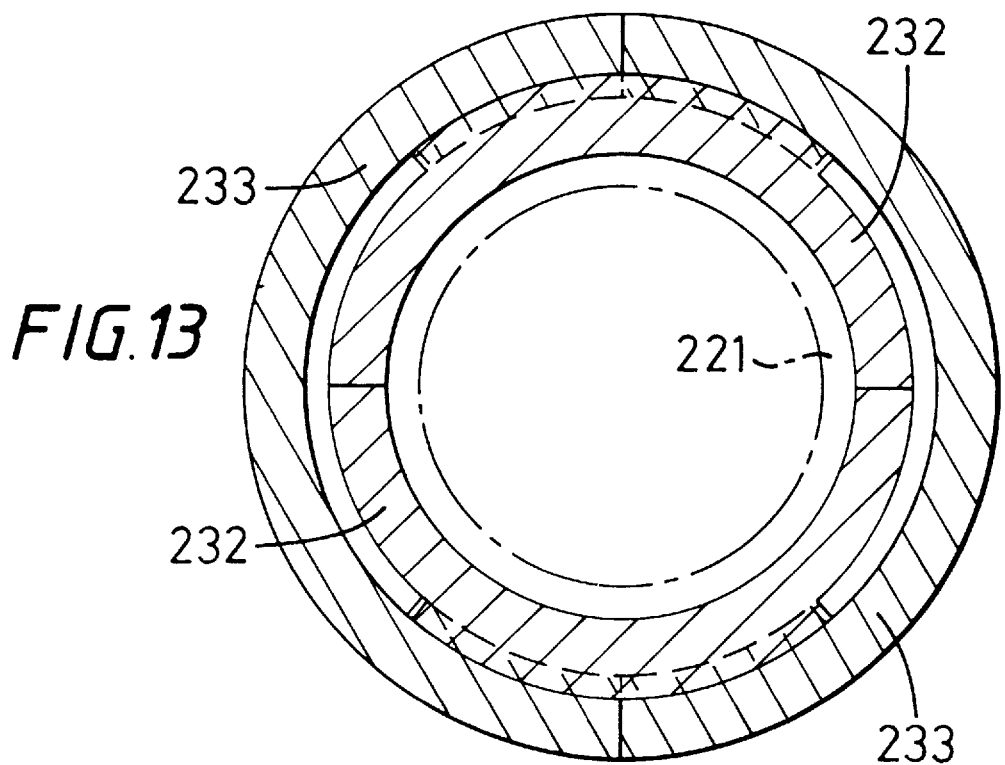
FIG. 13 is a view similar to FIG. 12 but with the outer member rotated through 90° relative to the inner member.

Further details of the interaction of the male and female members can be seen in FIGS. 12 and 13 which are sections showing the relative positions of the inner member 232 and outer member 233 during assembly and when ready for use.

In order to replace the outer member 233 the pins 234, 237 are withdrawn and the outer member 233 rotated 90° relative to the inner member 232. In this position the outer sections 203, 213 can simply be removed from the inner sections 202, 212 and replaced without removal of the inner member 232.

Figure 14:
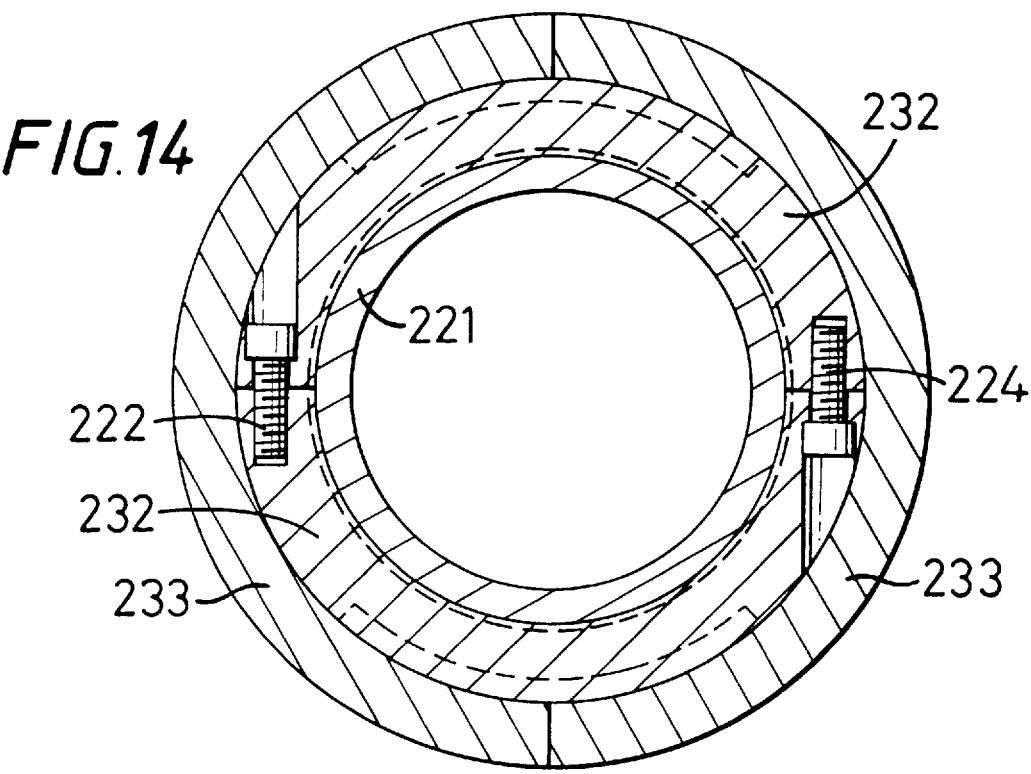
FIG. 14 is a section showing how the outer member inhibits separation of the socket screws holding the inner sections onto a drill string.
Figure 15:
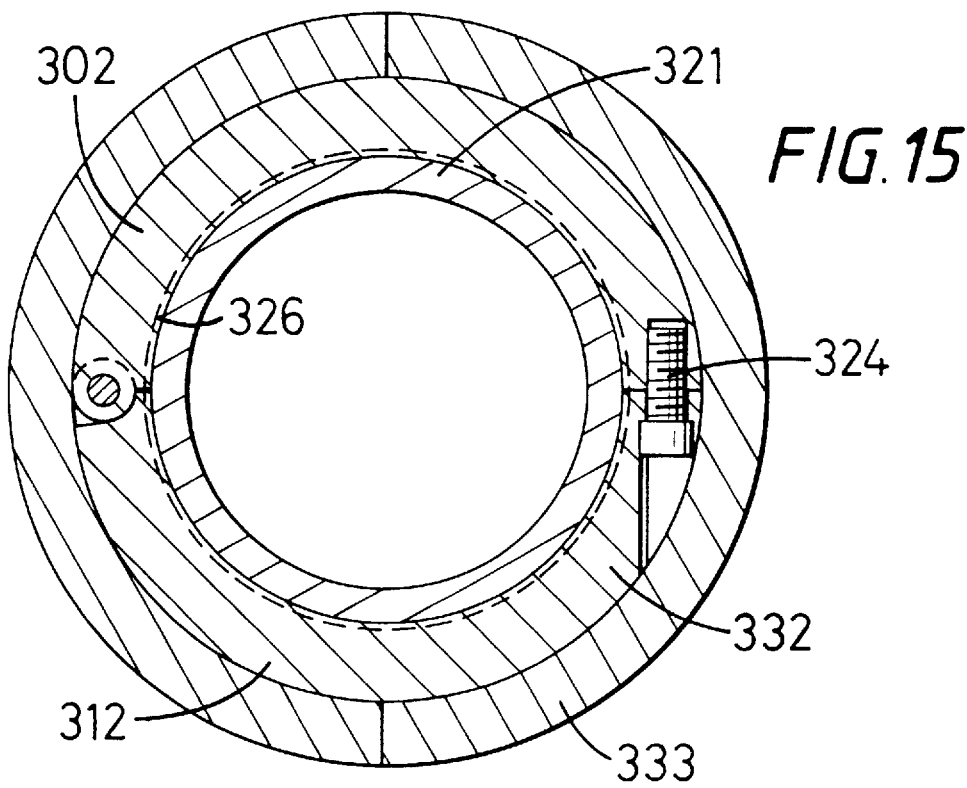
FIG. 15 is a view similar to FIG. 14 but showing a third embodiment of an apparatus in accordance with the present invention in which the two inner sections are connected by a hinge.

Various modifications to the embodiments described are envisaged. For example, in the two embodiments thus far described the two inner sections are held together by four socket screws. This is shown in FIG. 14 in relation to the embodiment shown in FIGS. 4 to 13. However, the inner sections could be hinged together at one side and bolted together at the other as shown in FIG. 15.

Figure 16:
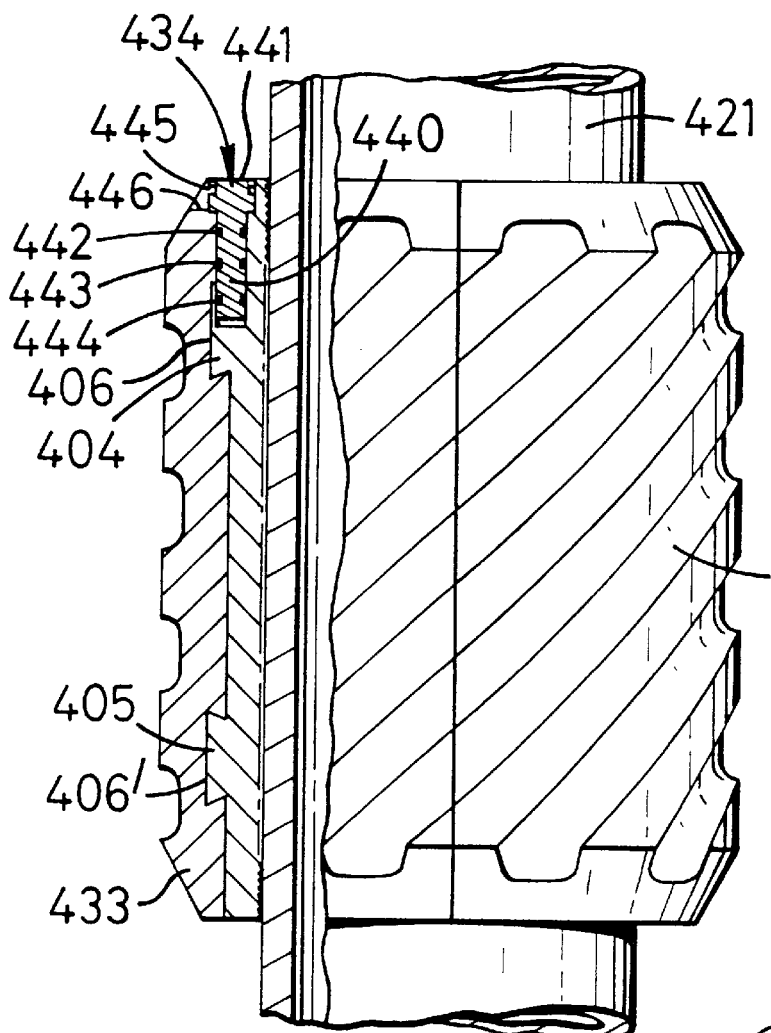
FIG. 16 is a side view, partly in elevation and partly in cross-section of a fourth embodiment of an apparatus in accordance with the present invention.
Figure 17:
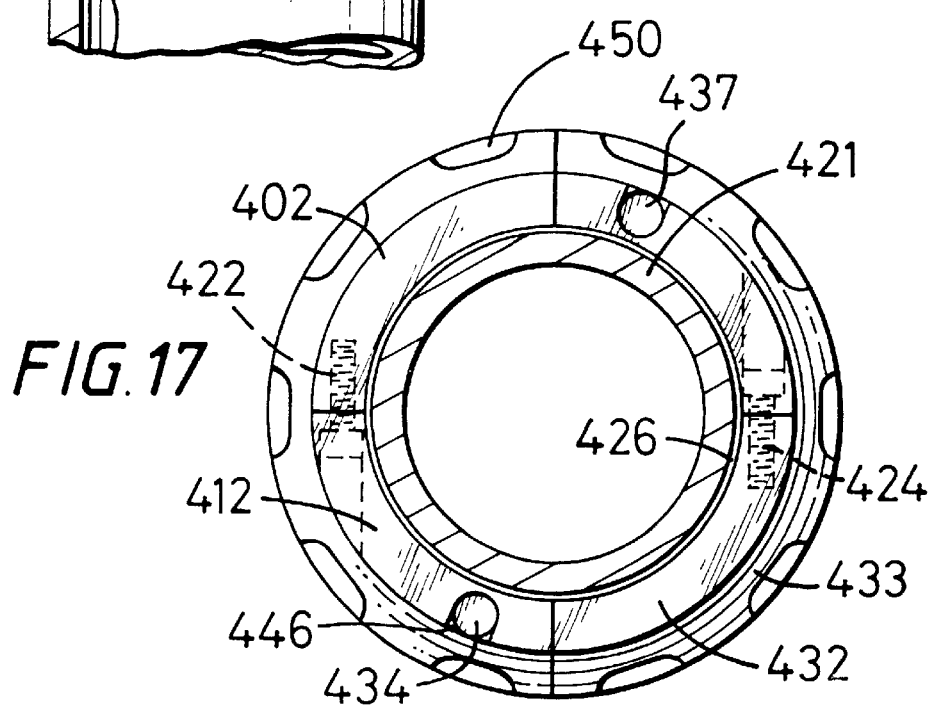
FIG. 17 is a top plan view of the apparatus shown in FIG. 16, the drill pipe being shown in cross-section.

The outer surface of the outer member 233 may be smooth. However, as shown in FIG. 16 the outer surface of the outer member 433 is preferably provided with a plurality of channels 450. In use, as the drill string 421 rotates the channels 450 induce turbulence in the mud surrounding the apparatus. This turbulence helps maintain cuttings and other materials in suspension and thus reduces the difficulties associated with sedimentation discussed hereinbefore.

As can be seen in FIG. 16 the pin 434 comprises a shaft 440 and a head 441. The shaft 440 is provided with three recesses 442, 443, 444 each of which is fitted with an o-ring. Each o-ring acts between the shaft 440 and the wall of the bore in which it is located. This helps inhibit the pin 434 inadvertently becoming separated from the remainder of the apparatus.

The head 441 of the pin 434 is also provided with a groove 445 which is not provided with an o-ring. When it is desired to remove the pin 434 a screwdriver or similar flat bladed tool is inserted through a cutaway portion 446 and the blade inserted into the groove 445. The pin 434 can then be levered upwardly and then removed by hand or with the assistance of a pair of pliers.

Various modifications to the embodiments described are envisaged, for example, if desired, the inner members could be rotatably mounted on a drill string, for example between two stop collars. However, this is not recommended.

Figure 18:
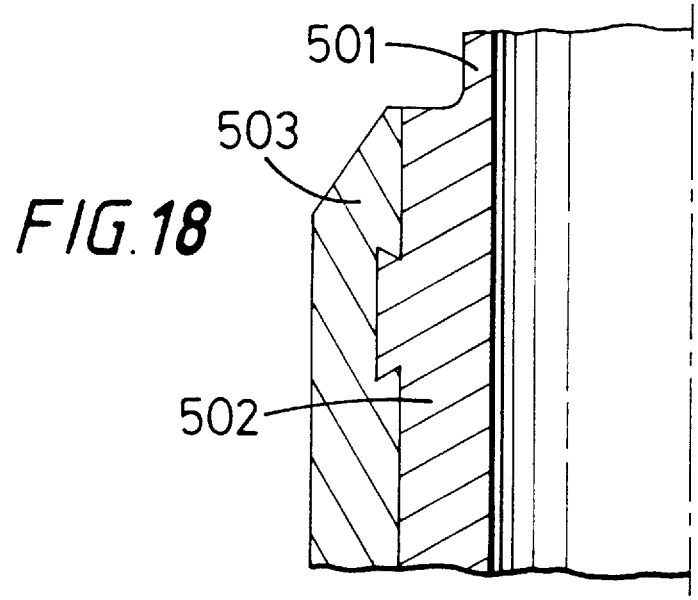
FIG. 18 is a view similar to FIG. 11 but showing a fifth embodiment of an apparatus in accordance with the present invention.
Figure 19:
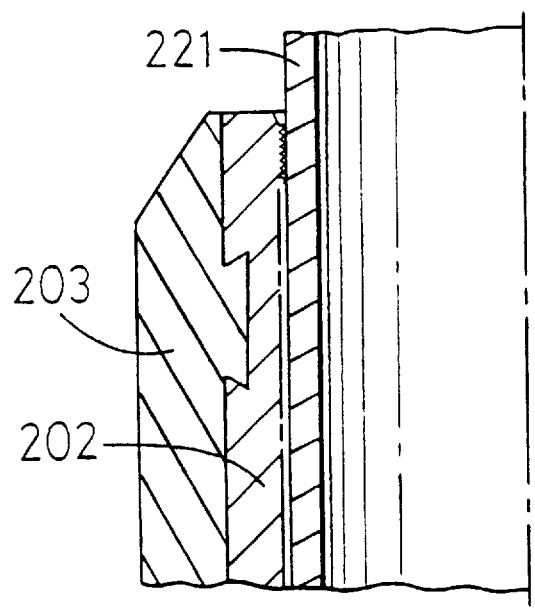
FIG. 19 is a view similar to FIG. 11 but showing a sixth embodiment of an apparatus in accordance with the present invention.
Figure 20:
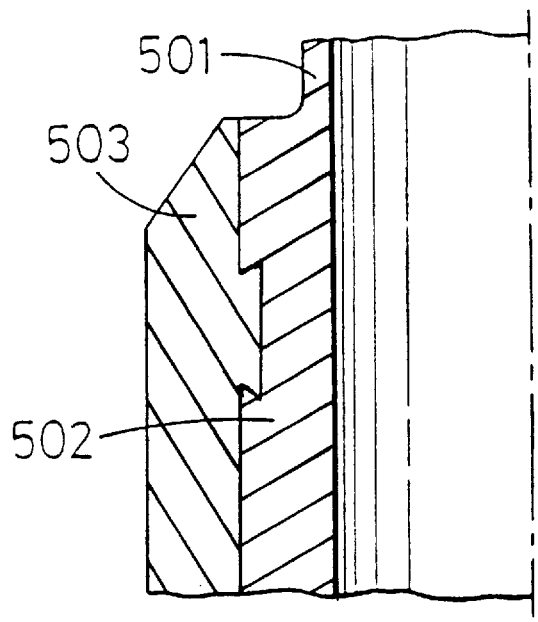
FIG. 20 is a view similar to FIG. 18 but showing a seventh embodiment of an apparatus in accordance with the present invention.

Turning now to FIG. 18, the embodiment shown is generally similar to that shown in FIG. 11 except that the inner member is formed as an integral part of the drill string. Turning now to FIG. 19, the embodiment shown is generally similar to that shown in FIG. 11 except that the male member is provided on the outer section, for engaging the female member on the inner section. Similarly, FIG. 20 illustrates an embodiment which is generally similar to that shown in FIG. 18 except that the male member is provided on the outer section, for engaging the female member on the drill string.

The embodiment shown in FIG. 19 is generally similar to that shown in FIG. 1 except that instead of being smooth the outer surface of the outer section 603 is provided with a plurality of tungsten carbide chips. In use, the apparatus is mounted on a tool string and lowered down a casing until it enters a hole previously cut in the casing. Rotation of the tool string causes the tungsten carbide chips to smooth the edges of the hold. If desired, the outer surface of the outer section 603 may be convex so that the apparatus can be used as an opening mill.

I claim:

1. An apparatus for use in a wellbore, which apparatus comprises an inner member mountable on a drill string, and an outer member removably mounted on said inner member, one of said inner member and said outer member being provided with at least one male member, and the other of said inner member and outer member being provided with at least one female member which co-operates with said male member to support said outer member on said inner member, at least part of said male member being of dovetail cross-section and at least part of said female member comprising a dovetail slot.

2. An apparatus as claimed in claim 1, characterised in that said inner member comprises two sections.

3. An apparatus as claimed in claim 1, wherein said inner member is provided with gripping means to help ensure that said inner member can be firmly attached to said drill string.

4. An apparatus as claimed in claim 3, wherein said gripping means comprises a thread.

5. An apparatus as claimed in claim 1, including a connector for securing said inner member to said drill string and wherein said outer member inhibits said connector separating from said apparatus when said outer member is in its operative position.

6. An apparatus as claimed in claim 1, including at least one pin to inhibit relative rotation between said inner member and said outer member.

7. An apparatus as claimed in claim 1, wherein said pin is installed in a cavity which extends generally parallel to the longitudinal axis of said apparatus and is formed by alignment of a groove in said inner member and a groove in said outer member.

8. An apparatus as claimed in claim 1, wherein said outer member is provided with means which, when said apparatus is in use, agitate drilling mud in the vicinity thereof.

9. An apparatus as claimed in claim 8, wherein said means comprise grooves.

10. An apparatus as claimed in claim 1, wherein said outer member comprises a tool.

11. An apparatus as claimed in claim 10, wherein said tool comprises a mill.

12. An apparatus for use in a wellbore, which apparatus comprises an inner member mountable on a drill string, and an outer member removably mounted on said inner member, wherein one of said inner member and said outer member is provided with at least one male member and the other of said inner member and outer member is provided with at least one female member which co-operates with said male member to support said outer member on said inner member, wherein said inner member comprises two sections, and wherein said male member and said female member extend substantially around the entire periphery of said inner member and said outer member and are of substantially uniform cross-section throughout.

13. An apparatus as claimed in claim 12, wherein at least part of said male member is of dovetail cross-section and at least part of said female member comprises a dovetail slot.

14. An apparatus as claimed in claim 12, wherein said sections are hinged together.

15. An apparatus as claimed in claim 12, wherein said inner member is provided with gripping means to help ensure that said inner member can be firmly attached to said drill string.

16. An apparatus as claimed in claim 15, wherein said gripping means comprises a thread.

17. An apparatus as claimed in claim 12, including a connector for securing said inner member to said drill string and wherein said outer member inhibits said connector separating from said apparatus when said outer member is in its operative position.

18. An apparatus as claimed in claim 12, including at least one pin to inhibit relative rotation between said inner member and said outer member.

19. An apparatus as claimed in claim 18, wherein said pin is installed in a cavity which extends generally parallel to the longitudinal axis of said apparatus and is formed by alignment of a groove in said inner member and a groove in said outer member.

20. An apparatus as claimed in claim 12, wherein said outer member is provided with means which, when said apparatus is in use, agitate drilling mud in the vicinity thereof.

21. An apparatus as claimed in claim 20, wherein said means comprise grooves.

22. An apparatus as claimed in claim 12, wherein said outer member comprises a tool.

23. An apparatus as claimed in claim 12, wherein said tool comprises a mill.

24. An apparatus for use in a wellbore, which apparatus comprises an inner member mountable on a drill string, and an outer member removably mounted on said inner member, wherein one of said inner member and said outer member is provided with at least one male member and the other of said inner member and outer member is provided with at least one female member which co-operates with said male member to support said outer member on said inner member, wherein said inner member comprises two sections, and wherein said at least one male member is of discontinuous cross-section and said at least one female member is of discontinuous cross-section, said at least one male member and said at least one female member being shaped and configured so that said outer member can be offered up to said inner member and rotated relative thereto so that said male member is entrapped by said female member.

25. An apparatus as claimed in claim 24, wherein at least part of said male member is of dovetail cross-section and at least part of said female member comprises a dovetail slot.

26. An apparatus as claimed in claim 24, wherein said sections are hinged together.

27. An apparatus as claimed in claim 24, wherein said inner member is provided with gripping means to help ensure that said inner member can be firmly attached to said drill string.

28. An apparatus as claimed in claim 27, wherein said gripping means comprises a thread.

29. An apparatus as claimed in claim 24, including a connector for securing said inner member to said drill string and wherein said outer member inhibits said connector separating from said apparatus when said outer member is in its operative position.

30. An apparatus as claimed in claim 24, including at least one pin to inhibit relative rotation between said inner member and said outer member.

31. An apparatus as claimed in claim 30, wherein said pin is installed in a cavity which extends generally parallel to the longitudinal axis of said apparatus and is formed by alignment of a groove in said inner member and a groove in said outer member.

32. An apparatus as claimed in claim 24, wherein said outer member is provided with means which, when said apparatus is in use, agitate drilling mud in the vicinity thereof.

33. An apparatus as claimed in claim 32, wherein said means comprise grooves.

34. An apparatus as claimed in claim 24, wherein said outer member comprises a tool.

35. An apparatus as claimed in claim 24, wherein said tool comprises a mill.

36. A stabilizer for use in a wellbore, which stabilizer comprises an inner member mountable around a drill string, and an outer member removably mounted around said inner member, wherein one of said inner member and said outer member is provided with at least one male member and the other of said inner member and outer member is provided with at least one female member which co-operates with said male member to support said outer member on said inner member, wherein at least part of said male member is of dovetail cross-section and at least part of said female member comprises a dovetail slot, wherein said inner member comprises two sections which are hinged together, wherein said at least one male member is of discontinuous cross-section and said at least one female member is of discontinuous cross-section, said at least one male member and said at least one female member being shaped and configured so that said outer member can be offered up to said inner member and rotated relative thereto so that said male member is entrapped by said female member, wherein said inner member is provided with gripping means to help ensure that said inner member can be firmly attached to said drill string, said gripping means comprising a thread, wherein said apparatus includes a connector for securing said inner member to said drill string and wherein said outer member inhibits said connector separating from said apparatus when said outer member is in its operative position, at least one pin to inhibit relative rotation between said inner member and said outer member, said pin being installed in a cavity which extends generally parallel to the longitudinal axis of said apparatus and is formed by alignment of a groove in said inner member and a groove in said outer member, and wherein said outer member is provided with means which, when said apparatus is in use, agitate drilling mud in the vicinity thereof, said means comprising grooves.

37. A drill string having a stabilizer which stabilizer comprises a stabilizer for use in a wellbore, which stabilizer comprises an inner member mountable on a drill string, and an outer member removably mounted on said inner member, wherein one of said inner member and said outer member is provided with at least one male member and the other of said inner member and outer member is provided with at least one female member which co-operates with said male member to support said outer member on said inner member, wherein at least part of said male member is of dovetail cross-section and at least part of said female member comprises a dovetail slot, wherein said inner member comprises two sections which are hinged together, wherein said at least one male member is of discontinuous cross-section and said at least one female member is of discontinuous cross-section, said at least one male member and said at least one female member being shaped and configured so that said outer member can be offered up to said inner member and rotated relative thereto so that said male member is entrapped by said female member, wherein said inner member is provided with gripping means to help ensure that said inner member can be firmly attached to said drill string, said gripping means comprising a thread, wherein said apparatus includes a connector for securing said inner member to said drill string and wherein said outer member inhibits said connector separating from said apparatus when said outer member is in its operative position, at least one pin to inhibit relative rotation between said inner member and said outer member, said pin being installed in a cavity which extends generally parallel to the longitudinal axis of said apparatus and is formed by alignment of a groove in said inner member and a groove in said outer member, and wherein said outer member is provided with means which, when said apparatus is in use, agitate drilling mud in the vicinity thereof, said means comprising grooves.

38. An apparatus for use in a wellbore, which apparatus comprises an inner member mountable on a drill string and an outer member removably mounted on said inner member wherein said inner member comprises two sections, and said inner member is provided with gripping means for helping to ensure that said inner member can be firmly attached to said drill string.

39. An apparatus as claimed in claim 38, characterised in that said sections are hinged together.

40. An apparatus for use in a wellbore, which apparatus comprises an inner member forming part of a drill string, and an outer member removably mounted on said inner member, one of said inner member and said outer member being provided with at least one male member, and the other of said inner member and outer member being provided with at least one female member which co-operates with said male member to support said outer member on said inner member, at least part of said male member being of dovetail cross-section and at least part of said female member comprises a dovetail slot.

41. An apparatus for use in a wellbore, which apparatus comprises an inner member forming part of a drill string and an outer member removably mounted on said inner member, wherein one of said inner member and said outer member is provided with at least one male member and the other of said inner member and outer member is provided with at least one female member which co-operates with said male member to support said outer member on said inner member, wherein said inner member comprises two sections, and wherein said at least one male member is of discontinuous cross-section and said at least one female member is of discontinuous cross-section, said at least one male member and said at least one female member being shaped and configured so that said outer member can be offered up to said inner member and rotated relative thereto so that said male member is entrapped by said female member.

* * * * *